(12) United States Patent
Higgins et al.

(10) Patent No.: US 11,015,800 B2
(45) Date of Patent: *May 25, 2021

(54) SOLID FUEL BURNING-FURNACE HAVING A VERTICALLY MOUNTED CYLINDRICAL COMBUSTION CHAMBER

(71) Applicants: Daniel R Higgins, Tigard, OR (US); Eugene Sullivan, Mobile, AL (US)

(72) Inventors: Daniel R Higgins, Tigard, OR (US); Eugene Sullivan, Mobile, AL (US)

(73) Assignee: Sullivan, Higgins & Brion PPE LLC, Mobile, AL (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/258,479

(22) Filed: Jan. 25, 2019

(65) Prior Publication Data

US 2019/0331335 A1   Oct. 31, 2019

Related U.S. Application Data

(63) Continuation of application No. 15/444,209, filed on Feb. 27, 2017, now Pat. No. 10,215,398, which is a
(Continued)

(51) Int. Cl.
   *F22B 21/36* (2006.01)
   *F22B 31/00* (2006.01)
   (Continued)

(52) U.S. Cl.
   CPC ......... *F22B 31/003* (2013.01); *F22B 21/341* (2013.01); *F22B 21/36* (2013.01);
   (Continued)

(58) Field of Classification Search
   CPC ...... F22B 21/341; F22B 21/36; F22B 31/003; F22B 31/0007; F22B 37/72; F23G 5/04;
   (Continued)

(56) References Cited

U.S. PATENT DOCUMENTS 2,730,971 A * 1/1956 Birkner .................. F23B 1/00
                                                              110/188
2,856,872 A * 10/1958 Steinert .................. F23K 3/00
                                                              110/106

(Continued)

FOREIGN PATENT DOCUMENTS

JP    S59176502 A   10/1984
RU    2029193 C1    2/1995
(Continued)

*Primary Examiner* — Gregory A Wilson
(74) *Attorney, Agent, or Firm* — Scheinberg & Associates, PC; Michael O. Scheinberg

(57) ABSTRACT

A ground supported power boiler is described combining a refractory lined and insulated conical floor; an insulated cylindrical combustion chamber; a cylindrical furnace with water tube wall; a rectangular convective section; a single vertical steam drum; tangential injection of the fuel and combustion air; means for fluidizing the fuel bed; means for selectively stripping particulates from the flue gases; multi-stage particulate stripping and filtering from flue gases, means for using the walls of steam drum as steam/water droplet separator, means for recirculating and capturing heat from the flue gases; means for pressurizing the interior of the boiler above atmospheric pressure; means for heating and drying fuel prior to feeding the fuel to the boiler; means for creating hydrogen shift reaction; means for eliminating any need for sootblowing; and designed to not require the use of an induced draft fan.

23 Claims, 9 Drawing Sheets

Related U.S. Application Data continuation of application No. 14/826,194, filed on Aug. 13, 2015, now Pat. No. 9,581,326.

(60) Provisional application No. 62/038,153, filed on Aug. 15, 2014.

(51) Int. Cl.
| | |
|---|---|
| *F23G 5/32* | (2006.01) |
| *F23J 15/02* | (2006.01) |
| *F23G 5/04* | (2006.01) |
| *F23G 5/24* | (2006.01) |
| *F23G 5/30* | (2006.01) |
| *F23G 5/44* | (2006.01) |
| *F23G 5/46* | (2006.01) |
| *F22B 21/34* | (2006.01) |

(52) U.S. Cl.
CPC ............ *F22B 31/0007* (2013.01); *F23G 5/04* (2013.01); *F23G 5/24* (2013.01); *F23G 5/30* (2013.01); *F23G 5/32* (2013.01); *F23G 5/444* (2013.01); *F23G 5/46* (2013.01); *F23J 15/025* (2013.01); *F23J 15/027* (2013.01); *F23G 2205/20* (2013.01); *F23G 2206/10* (2013.01); *F23G 2206/203* (2013.01); *F23G 2209/12* (2013.01); *F23G 2209/261* (2013.01); *Y02E 20/12* (2013.01)

(58) Field of Classification Search
CPC ..... F23G 5/24; F23G 5/30; F23G 5/32; F23G 5/444; F23G 5/46; F23J 15/025; F23J 15/027; F23J 2205/20; F23J 2206/10; F23J 2206/203; F24H 2230/00; F24H 2230/02; F24H 1/32; F22D 1/00
See application file for complete search history.

(56) References Cited

U.S. PATENT DOCUMENTS

| | | | |
|---|---|---|---|
| 2,903,981 A | 9/1959 | Brink | |
| 3,631,822 A | 1/1972 | Near et al. | |
| 3,695,192 A * | 10/1972 | Von Brimer | F23J 11/00 110/203 |
| 3,834,327 A * | 9/1974 | Hellstrom | F23G 5/32 110/216 |
| 4,047,972 A * | 9/1977 | Stumbar | F23J 3/02 134/2 |
| 4,200,438 A | 4/1980 | Kaimann et al. | |
| 4,469,050 A | 9/1984 | Korenberg | |
| 4,627,173 A * | 12/1986 | O'Hagan | F23G 5/30 110/224 |
| 4,702,073 A * | 10/1987 | Melconian | F23R 3/06 60/39.464 |
| 4,951,612 A * | 8/1990 | Gorzegno | B01J 8/388 110/216 |
| 5,117,770 A | 6/1992 | Hassinen | |
| 5,339,774 A | 8/1994 | Tang | |
| 5,911,092 A | 6/1999 | Hotta et al. | |
| 6,336,429 B1 | 1/2002 | Wiener et al. | |
| 8,276,528 B1 * | 10/2012 | Higgins | F23D 1/00 110/111 |
| 8,530,463 B2 | 9/2013 | Cartt et al. | |
| 8,590,463 B1 * | 11/2013 | Higgins | F23K 1/04 110/118 |
| 2013/0247800 A1 | 9/2013 | Higgins et al. | |

FOREIGN PATENT DOCUMENTS

| | | |
|---|---|---|
| RU | 177616 U1 | 3/2018 |
| WO | 2013078423 A1 | 5/2013 |

\* cited by examiner

Section B-B

DETAIL VIEW C

DETAIL VIEW F

SECTION D-D

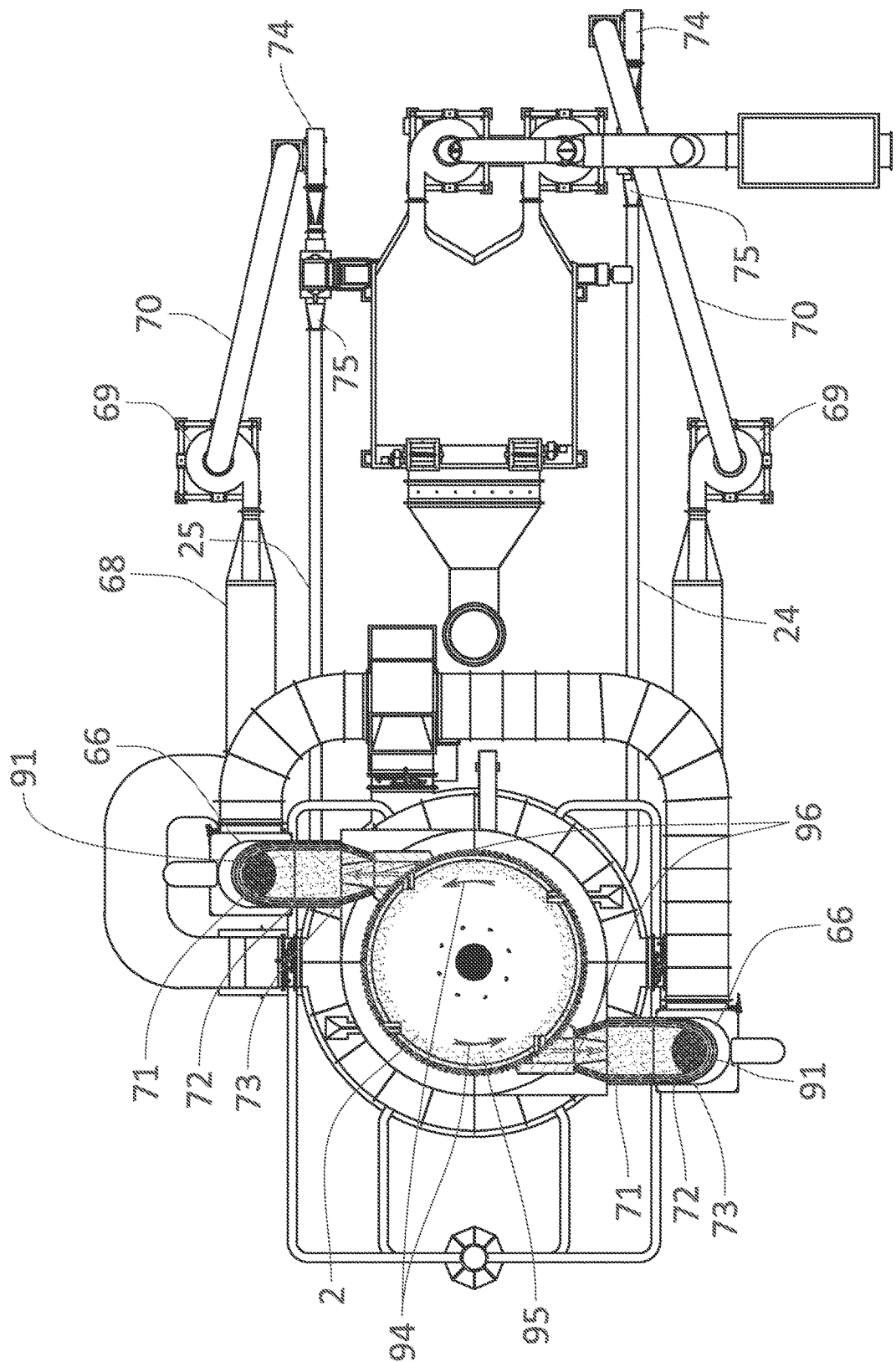

SOLID FUEL BURNING-FURNACE HAVING A VERTICALLY MOUNTED CYLINDRICAL COMBUSTION CHAMBER

This application is a Continuation of U.S. application Ser. No. 15/444,209, filed Feb. 27, 2017, which claimed benefit of Continuation of U.S. application Ser. No. 14/826,194, filed Aug. 13, 2015, issued as U.S. Pat. No. 9,581,326, which claimed priority from U.S. Provisional Pat. App. No. 62/038,153, filed Aug. 15, 2014.

FIELD OF THE INVENTION

The invention relates generally to a method and apparatus to produce steam for power production and for process requirements through the combustion of fuels.

BACKGROUND OF THE INVENTION

Power boilers have long been used by industries and utilities to produce steam for power production and for process requirements. These boilers come in many types and sizes ranging from 15 tons per hour steam production to 800 tons per hour or more. These boilers burn a variety of fuels including: Bark, sawdust, wood chips, and wood trimmings; wood or other biomass pellets; urban waste, refuse, and tire derived fuel (TDF); crushed coal, pet coke, fuel oils, and natural gas; sludge and fiber line rejects; sugar cane bagasse, pith, leaves, tops and other agriculture straw-based fuels; or other liquid, solid, or gaseous fuel, or a combination of fuels, and the solid fuels may have moisture content as high as 65%.

These boilers are typically constructed of heavy wall steel tubes welded side by side into straight wall panels that form the front, rear and side walls of the boiler. The lower portion of this box forms the combustion chamber of the boiler and is sometimes called the furnace. The tubes are typically 2" to 3" in diameter and spaced apart 2" to 4" center to center. If there are gaps between the tubes they are typically filled with steel strips about ¼" thick by the width of the gap.

The entire panel is seal welded air tight. The lower ends of the wall tubes are welded into larger diameter horizontal header pipes that feed water to the walls. The tops of the wall tubes are also connected to larger diameter horizontal collector pipes that carry the water away from the walls to a steam drum, located at the top of the boiler. The front wall tubes are typically bent over to form the roof of the boiler and those tubes can terminate in a collector pipe or directly to the steam drum. Similarly the rear wall tubes are typically bent to create a "bullnose" or "nose arch" to direct combustion gasses across the convective section of the boiler and then terminate in a water drum, steam drum, or collector pipe at the top of the boiler. The top of the bullnose is usually at the elevation of the water drum. Downcomer pipes connect the steam drum or water drum at the top of the boiler to the header pipes at the bottom of the tube walls and feed water from the drum to the walls. The bottom of the boiler can be a travelling or vibrating grate, tilting grate, sloping grate, step grate, fluidized bed, or a Stepped Floor as described in U.S. Pat. No. 8,707,876. Fuel enters the boiler through a chute or chutes penetrating one or more walls of the boiler and may be broadcast into the boiler by a fuel distributor, for example, as described in U.S. Pat. No. 8,276,528. The fuel falls to the floor or grate where it is mixed with air and burns. The heat released by the burning fuel is absorbed by the wall tubes and heats the water in the walls, where the water expands thermally and starts to boil. The heated and boiling water is less dense than the water in the downcomer pipes therefore a natural circulation is created with hotter water rising in the tube walls and cooler water descending in the downcomer pipes. The natural circulation is an inherent safety feature of these boilers as the circulation rate increases as more fuel is burned and more heat released in the combustion chamber.

As the water circulates from the steam drum, down through the downcomers, up through the walls, and back to the steam drum, some or all of the steam is produced in the walls. Some of the steam may also be produced in the generating bank, sometimes called the boiler bank. In older two drum boilers, the generating bank is a set of tubes connecting the bottom of the steam drum to the top of a water drum, sometimes called a mud drum, located up to thirty feet or so directly below the steam drum. The steam and mud drums are typically cylindrical pressure vessels with their axes oriented horizontally and parallel to each other and to the front wall of the boiler. In a two drum boiler the steam drum is generally located directly above the water drum and there are hundreds of tubes connecting the two drums. The generating bank is arranged so that hot gasses from the furnace flow across the tubes and heat the water circulating inside. About half of the tubes in the generating bank of a two drum boiler are up flow tubes and the remainders are down flow tubes. The gas cools as it passes through the generating bank, therefore the first tubes the gas contacts (the front tubes as the gas flow through a boiler is generally front to back) are hotter and more boiling occurs in those tubes. The boiling water is less dense so the water circulates from the steam drum down through the rear tubes to the water drum and then up through the front tubes back to the steam drum. The steam drum is generally about half full of water with saturated steam being released at the surface. The steam goes through a set of moisture separators and then to the superheaters. In newer single drum boilers there is no water drum, instead, the generating bank is fed by external (non-heated) downcomers from the steam drum, and the water circulates down the downcomers and back up through all of the generating bank tubes to the steam drum. Single drum boilers are less expensive to build because the drums, especially with hundreds of tube penetrations, are the most expensive components. Steam and water drums are also expensive to build due to their large diameter, typically up to five feet or more, requiring commensurately thicker walls to withstand the internal pressure. Single drum boilers also have other advantages including more flexible arrangements for locating the steam drum and generating bank.

Some boilers also have sets of tubes located just at the furnace exit and arranged to cross the boiler at the top of the combustion chamber. These are called screen tubes or screens, and are often arrayed as platens in which several tubes are in close parallel arrangement, one on top of another, extending from the front or rear wall of the boiler through the opposite wall. These platens are generally separated 12"-15" apart side to side and slope upward slightly to the other side of the boiler, or they may bend part way across the boiler and rise up vertically through the roof. The screen tubes are fed by external (non-heated) downcomers from the steam drum or water drum at their lower end and relieved back to the steam drum at their upper end. Water circulates from the steam drum or water drum through the screens and back up to the steam drum. The screens are located where the gasses are very hot and absorb heat by radiation and convection.

After the steam leaves the steam drum it goes to the superheaters. These are sets of tubes typically located at the top of the boiler, above the screen tubes and in front of the generating bank. The superheaters increase the temperature of the steam from the saturation temperature in the steam drum to the final temperature required by the process or the power plant.

The superheater tubes are typically arranged as vertical platens with up to a dozen tubes or more in close parallel arrangement front to back in each platen. There are many platens located across the width of the boiler with a spacing of 6"-15" between platens.

There are frequently two or more superheater sections with connecting pipes and/or desuperheaters between the sections. Desuperheaters or attemperators control the final steam temperature by spraying water into the steam, or other means.

In top supported boilers the superheater tubes start at the top of the boiler and drop vertically to just above the bullnose then run up and down a number of times before exiting back through the roof. The steam passes through the superheaters just once therefore the superheaters are not part of the boiler circulation circuits.

After the boiler flue gasses exit the generating bank, they typically flow through an economizer or an air heater. Economizers are tube bundles either, in cross flow or parallel flow to the gas stream, through which the feedwater passes once and is heated and then goes to the steam drum. The feedwater flow is controlled to maintain the water level in the steam drum. Feedwater makes up for the steam that is produced and exits the boiler.

Upon entry into the drum, feedwater is baffled and mixes with some of the water already within the steam drum to flow to the downcomer pipes or downcomer tubes. This feedwater mixed zone has higher density, which provides the driving head for the natural circulation in the boiler. The economizer may be located immediately after the generating bank integral with the boiler, or it may be located downstream from a tubular air heater or a dust collector.

Some of these boilers are supported from underneath (ground supported) but most, especially larger boilers, are hung from the top and expand downward as they heat up. A top supported boiler requires a very strong and expensive external structure to support the boiler.

Boilers as described above have been in use for many years and the technology is very mature, but they are very expensive and have significant operational limitations. Mechanical grates suffer from poor reliability and grate fired boilers and fluidized bed boilers are limited in the temperatures they can tolerate in the lower furnace otherwise they will over heat the grate or sand bed. Mechanical grates also do a poor job of mixing the combustion air and fuel because of the high airflow dictated by the requirements to cool the grate or fluidize the sand bend. This leaves little setup flexibility to improve combustion mixing throughout the greater furnace volume above the lower furnace. Bubbling fluidized bed boilers and especially circulating fluidized bed boilers suffer from extensive erosion due to the sand particles flowing with the flue gases and can have problems with sand agglomeration, sintering, and glassification. These deficiencies are addressed with the introduction of stepped floor and fuel drying chute technologies as described in U.S. Pat. Nos. 8,707,876 and 8,590,463 respectively, and U.S. patent application Ser. No. 13/851,883 for a V-cell boiler.

A problem with existing boilers is that very light fuels, such as sugar cane pith and bagasse, are especially difficult to burn efficiently because of their light weight and high moisture content. Woody, straw and other solid fuels at some point reach a small size where they (cinders) become entrained in the combustion gas flow and fly out of the furnace before they completely burn. The unburned fuel and sand carryover can agglomerate and plug the convective sections (superheater, generating bank, and economizer), abrade the boiler tubes, increase particulate emissions, and reduce the thermal efficiency of the boiler.

Good control over carbon monoxide in biomass boilers is a major and historical problem because airborne cinders have insufficient residence time, and poor air/fuel volumetric mixing energies. Airborne fuel particles are still shielded fuel, where the outer skin surface must be first burned before the next layer of fuel becomes available.

Many boilers in the sugar cane and other agriculture crop processing industries suffer from low reliability, high maintenance costs, high particulate emissions, and poor thermal performance for these reasons. Sugar cane is the largest crop grown in the world. Historically the sugar cane waste (leaves and tops) has been burnt in the field, but new regulations are preventing that for environmental reasons.

While the prevention of in-field burning increases the availability of biomass for power production, as described previously, sugar cane biomass is also difficult to burn because it is light, very wet, and has high sand contamination. Sugar cane companies are realizing the profit potential to cogenerate electricity with their process demands, but available, affordable boilers use outdated designs that cannot keep up with modern market demands. Other agricultural crop processing industries such as rice, wheat straw, palm oil, etc., also face similar problems with their boilers. Furthermore, skilled labor costs are also rising around the world, and it is becoming more expensive to construct and erect conventional boilers.

Therefore a new boiler design is needed that will improve the combustion of sugar cane based fuels and other fuels, keep the acquisition and erection costs to a minimum, maximize boiler availability with low maintenance, reduce particulate emissions by first complete burning and second by multi-stage stripping/filtering, and provide the owners with a more profitable alternative over the life of the investment.

SUMMARY OF THE INVENTION

In accordance with illustrative embodiments of the present invention, an apparatus to produce steam for power production and process requirements through the combustion of fuels is described.

In some embodiments, a boiler with a cylindrical furnace section having a vertical axis in which the combusting fuel and gases are rotated to centrifugally move entrained particulates and denser gases to the perimeter of the combustion chamber and incorporating at least one extraction duct for removing at least a portion of said particulates, said extraction duct intersecting said combustion chamber tangentially and at a location in the upper half of said combustion chamber, with less than 100% of the total gas moving through said cylindrical furnace section exiting out the top of said cylindrical furnace section and the balance of said gas flow exiting through at least one of said extraction ducts.

Some embodiments provide a method to produce steam for power production and process requirements through the combustion of fuels is described. In one illustrative embodiment, fuel and combustion air is tangentially injected into a ground supported power boiler, the power boiler comprising a refractory lined and insulated conical floor, an insulated cylindrical combustion chamber, a cylindrical furnace with water tube wall, a rectangular convective section, and a single vertical steam drum. The fuel bed of the power boiler is preferably fluidized. The particulates in power boiler are selectively stripped from the flue gases. The heat from the flue gases is recirculated and captured. The interior of the boiler of the power boiler is preferably pressurized to above atmospheric pressure. Prior to feeding the fuel to the boiler, fuel to the power boiler can be heated and dried.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which the numbers in this text refer to like numbers illustrated in the drawings, wherein:

FIG. 9 is an exterior plan view one of cylindrical furnace 2 of the boiler of FIGS. 1-2 in accordance with one or more embodiments of the present invention.

DETAILED DESCRIPTION

In one illustrative embodiment, a ground supported power boiler combines a refractory lined and insulated conical floor. The power boiler can include an insulated cylindrical combustion chamber. The power boiler can include a cylindrical furnace with a water tube wall. The power boiler can include a rectangular convective section. The power boiler can include a single vertical steam drum. The power boiler can include tangential injection of the fuel and combustion air. The power boiler can include means for fluidizing the fuel bed. The power boiler can include means for selectively stripping particulates from the flue gases. The power boiler can include means for recirculating and capturing heat from the flue gases. The power boiler can include means for pressurizing the interior of the boiler above atmospheric pressure. The power boiler can include means for heating and drying fuel prior to feeding the fuel to the boiler. The power boiler can be designed to not require the use of an induced draft fan.

The typical size of boilers embodiments of the present invention ranges in steam production from 25 tons per hour to about 250 tons per hour or more, and is limited only by the ability of the boiler to support its own weight and accommodate the inherent thermal expansion. The boiler is predominantly a solid fuel boiler but is capable of burning a variety of fuels, including but not limited to: Bark, sawdust, wood chips, and wood trimmings; wood or other biomass pellets; urban waste, refuse, and tire derived fuel (TDF); crushed coal, pet coke, fuel oils, and natural gas; sludge and fiber line rejects; sugar cane bagasse, pith, leaves, tops and other straw-based fuels; other agricultural waste fuels such as wheat straw, rice husk, palm oil seed husk; or other liquid, solid, or gaseous fuel, or a combination of fuels, and the solid fuels may have moisture content as high as 65%. Certain differences may be incorporated in different embodiment depending on the type of fuel to be burned. For example, if the fuel has a high ash or sand content, it may be beneficial to line the furnace with refractory to protect it from erosion. Or, if the boiler is to be used as a refuse incinerator, it may be necessary to line the boiler with ceramic tiles to provide corrosion protection. These different embodiments are described below and in the following claims.

Figure 1:
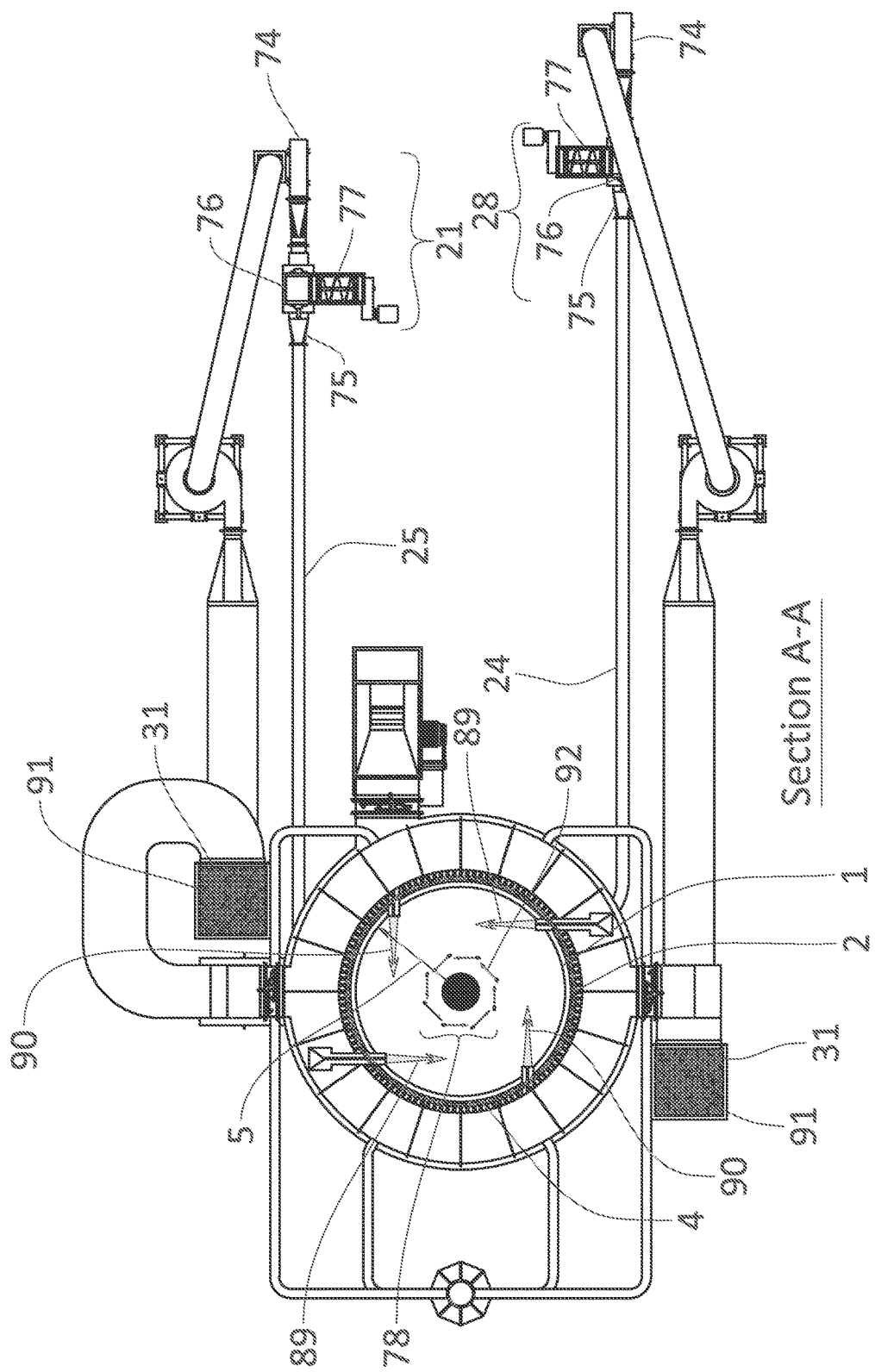
FIG. 1 is a sectional top view of a boiler at a first section A-A (section taken as shown in FIG. 3) with the front of the boiler to the left in accordance with one or more embodiments of the present invention.

Referring to FIG. 1, a sectional top view of a boiler is shown at a first section A-A with the front of the boiler to the left in accordance with one or more embodiments of the present invention. Combustion chamber 1 and furnace 2 of the boiler are circular in plan form, concentric, and create a cylindrical combustion chamber 1 and furnace 2.

The cylindrical design has several advantages including an inherently rigid structure, minimal material required to enclose a given volume, and the ability to efficiently circulate the combustion gases therein. Circulating the combustion gases is a feature of the many embodiments of present invention as described below.

Radius 5 of the furnace depends on, for example but not limited to, the required steaming rate of the boiler, the type of fuel or fuels to be burned, the moisture content of the fuel, and whether the furnace is refractory lined. According to an illustrative embodiment, radius 5 typically ranges from six to twelve feet.

Figure 2:
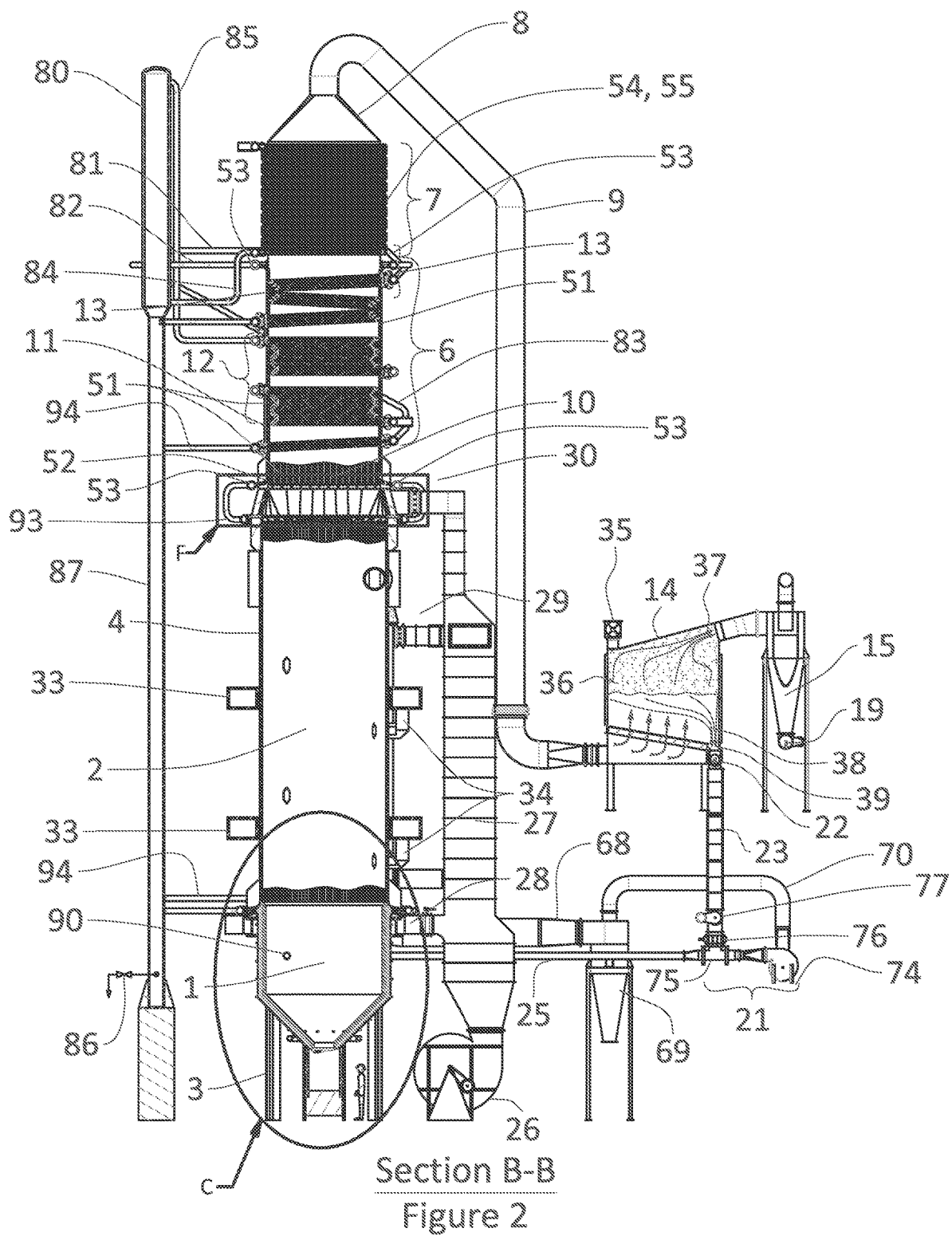
FIG. 2 is a sectional side view of the boiler of FIG. 1 at a second section B-B with the front of the boiler to the left in accordance with one or more embodiments of the present invention.

Referring now to FIG. 2, a sectional side view of the boiler of FIG. 1 is shown at a second section B-B with the front of the boiler to the left in accordance with one or more embodiments of the present invention. The entire boiler structure is supported by foundation structure 3 constructed from reinforced concrete, structural steel or a combination of steel and concrete depending on design criteria, local codes, and local building standards and practices. Foundation structure 3 may be circular in plan form, or octagonal, or another shape depending on the requirements to support the load and minimize building costs, and may have a plurality of separate support columns or continuous walls.

Combustion chamber 1 is supported from foundation structure 3 around its upper perimeter where a circular flange is formed for that purpose. Furnace tube walls 4 form cylindrical furnace chamber 2 with the tubes running vertically with the centerline of the tubes on common radius 5.

Above cylindrical furnace 2 is convective section 6, economizer section 7, converging top cap 8, and exit gas duct 9. The weights of convective section 6, economizer section 7, converging top cap 8, and a portion of the weight of exit gas duct 9 are all transferred to cylindrical furnace 2 by transition section 10.

Convective section 6 is rectangular in plan form therefore transition section 10 is circular at its lower end to match cylindrical furnace 2 and rectangular at its upper end to match convective section 6. Convective section 6 may contain screen section 11, superheater sections 12, and generating bank sections 13.

Figure 3:
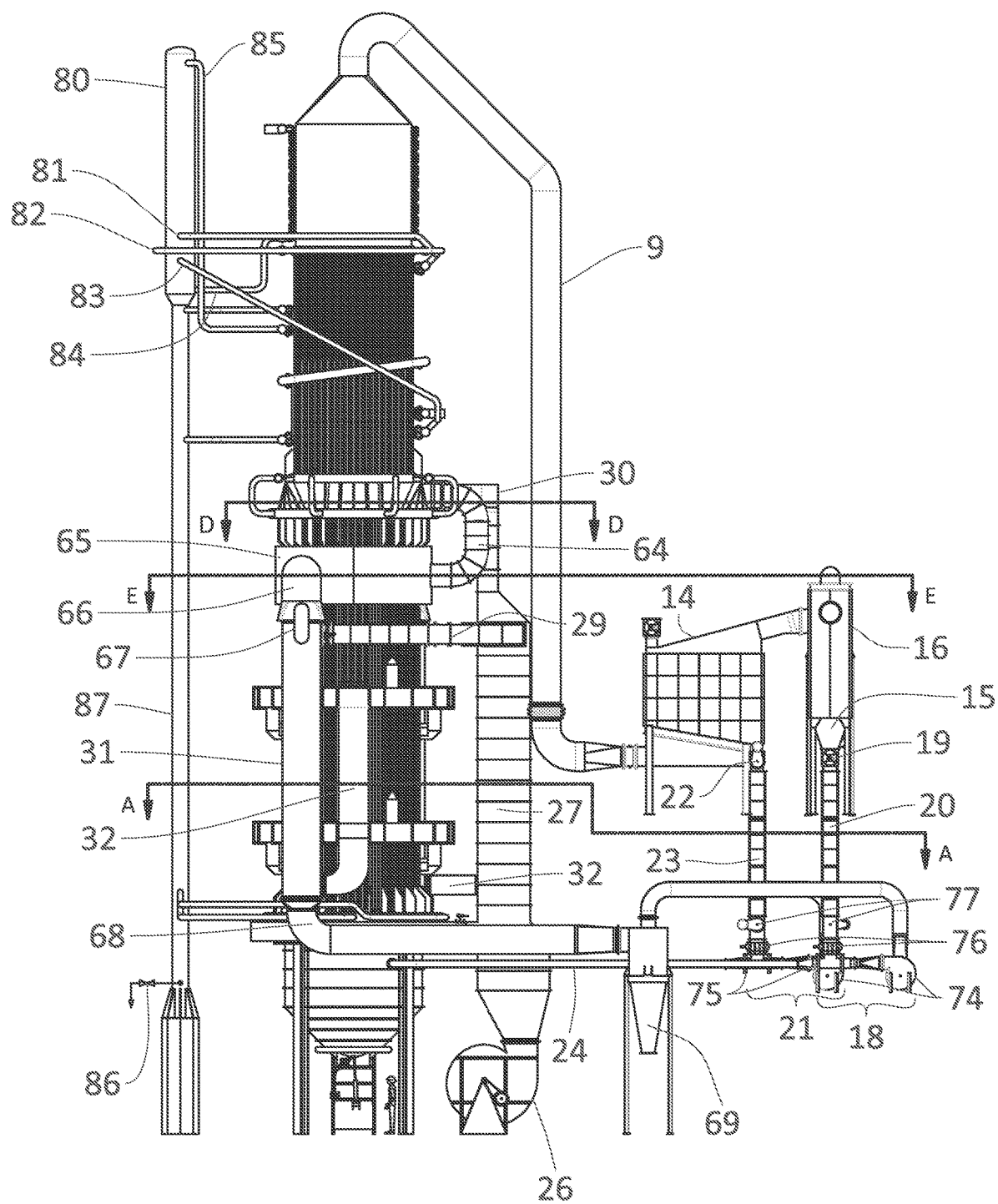
FIG. 3 is an exterior side view of a boiler in accordance with one or more embodiments of the present invention.
Figure 4:
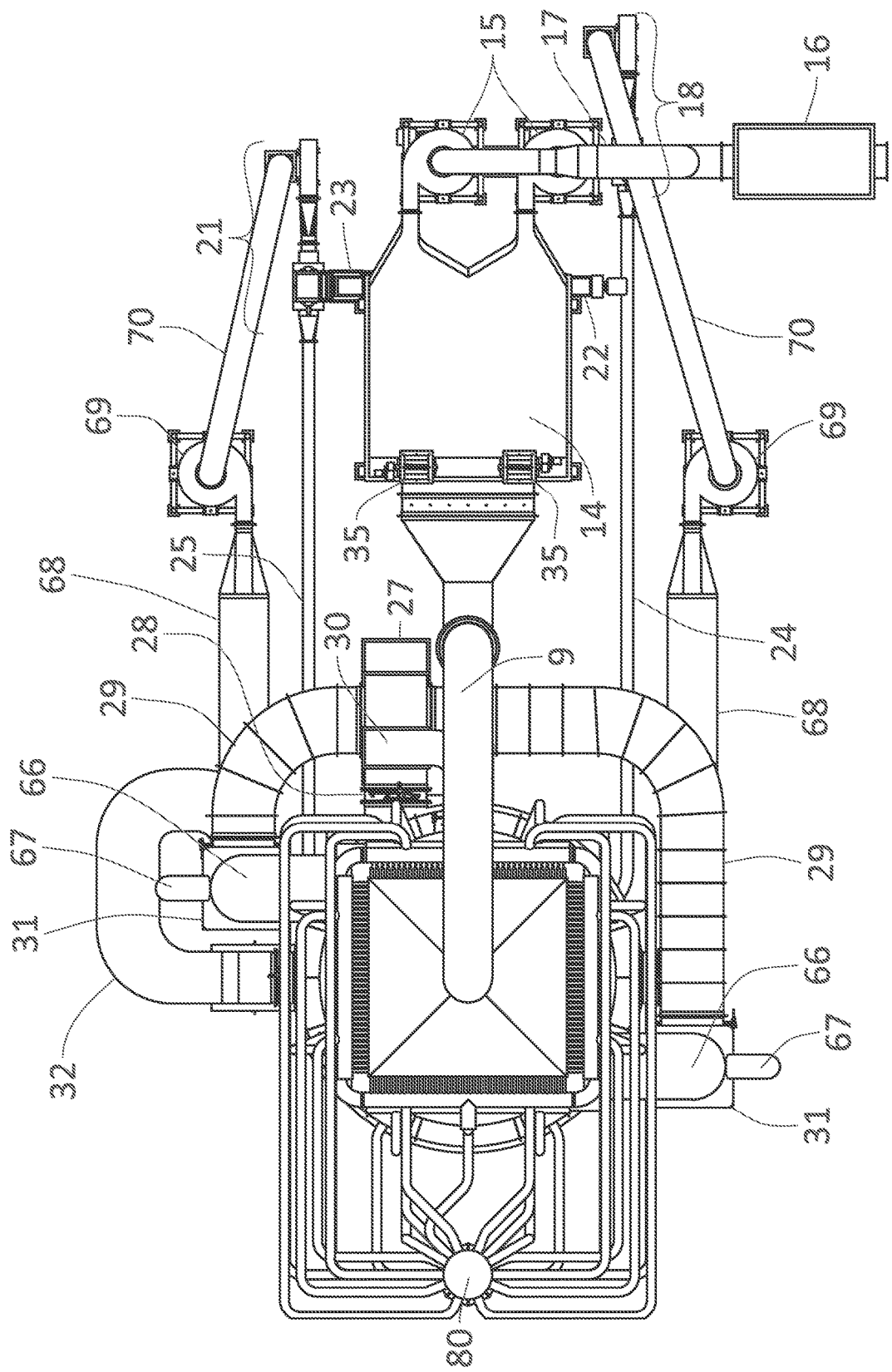
FIG. 4 is an exterior plan view of a boiler viewed from above with the front of the boiler to the left in accordance with one or more embodiments of the present invention.

Referring to FIGS. 2, 3, and 4, exit gas duct 9 connects to fluidized fuel dryer 14 which in turn is connected to separating cyclones 15. The gas discharge from separating cyclones 15 is connected to bag house 16 via connecting duct 17. From bag house 16 boiler flue gas goes to a stack (not shown).

Referring to FIGS. 2-4, forced draft fan 26 supplies combustion air to distribution duct 27 where it is further distributed to combustion chamber duct 28, air heater ducts 29, and transition section duct 30.

Figure 5:
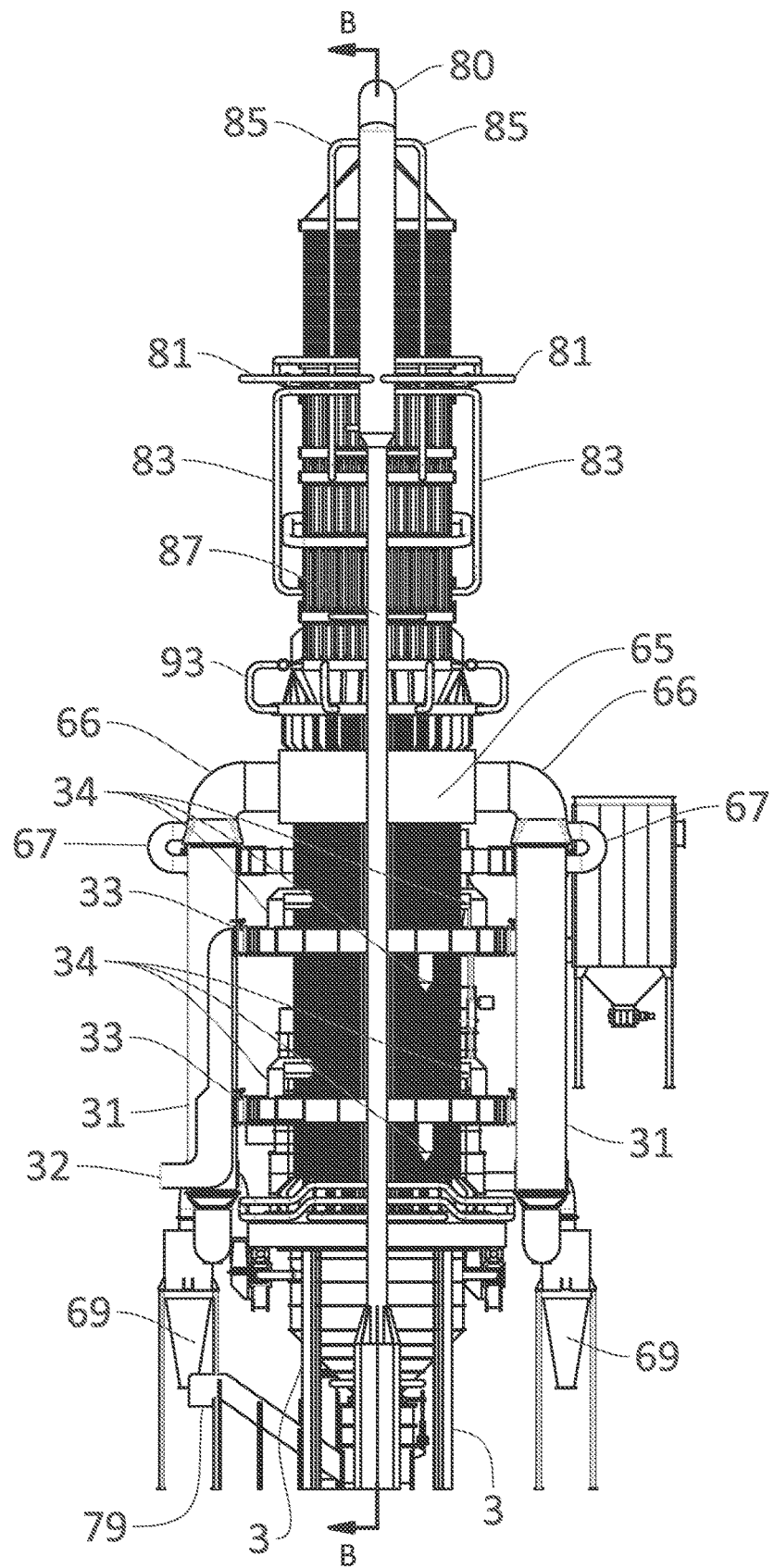
FIG. 5 is an exterior elevation view of a boiler from the front in accordance with one or more embodiments of the present invention.

Referring to FIGS. 4 and 5, air heaters 31 are composed of an array of thin wall steel tubes 91 running vertically surrounded by a steel shell. Combustion gas, extracted from the boiler as described below, flows through the air heater on the tube side while combustion air from air heater ducts 29 enters air heaters 31 at the top and makes multiple side to side passes while flowing to the bottom of air heaters 31 where it exits via hot air ducts 32 and flows to over fired air ducts 33 encircling the boiler. The hot combustion air then flows from over fired air ducts 33 to multiple over fired air nozzles 34 and is injected into the boiler.

Referring again to FIGS. 1-4, assuming the fuel has a high moisture content, fuel enters fluidized fuel dryer 14 through air locks 35 by way of upstream means not shown, and partially fills fluidized fuel dryer 14. Hot combustion gas from exit gas duct 9 enters the bottom of fluidized fuel dryer 14 under pressure from forced draft fan 26 and is injected into the fuel pile through multiple nozzles 36 and fluidizes the fuel. The flue gas is ideally at a temperature of 500-600 degrees Fahrenheit and the direct contact between the hot gas and the wet fuel partially dries the fuel.

As the fuel dries, smaller particles 37 will become entrained in the escaping gas and will be transported to separating cyclones 15 where the solid material is separated from the flue gas. The collected solid fuel material from cyclones 15 is transported to fuel injection system 18 by fuel conveyor 19 and fuel chute 20. The heavier, larger, and wetter fuel particles will migrate to the bottom of fluidized fuel dryer 14 where they will exit 38 into fuel trough 39. Fuel trough 39 is connected to fuel injection system 21 by fuel conveyor 22 and fuel chute 20. Fuel injection system 18 is connected to combustion chamber 1 by fuel injection pipe 24 and fuel injection system 21 is connected to combustion chamber 1 by fuel injection pipe 25.

Figure 6:
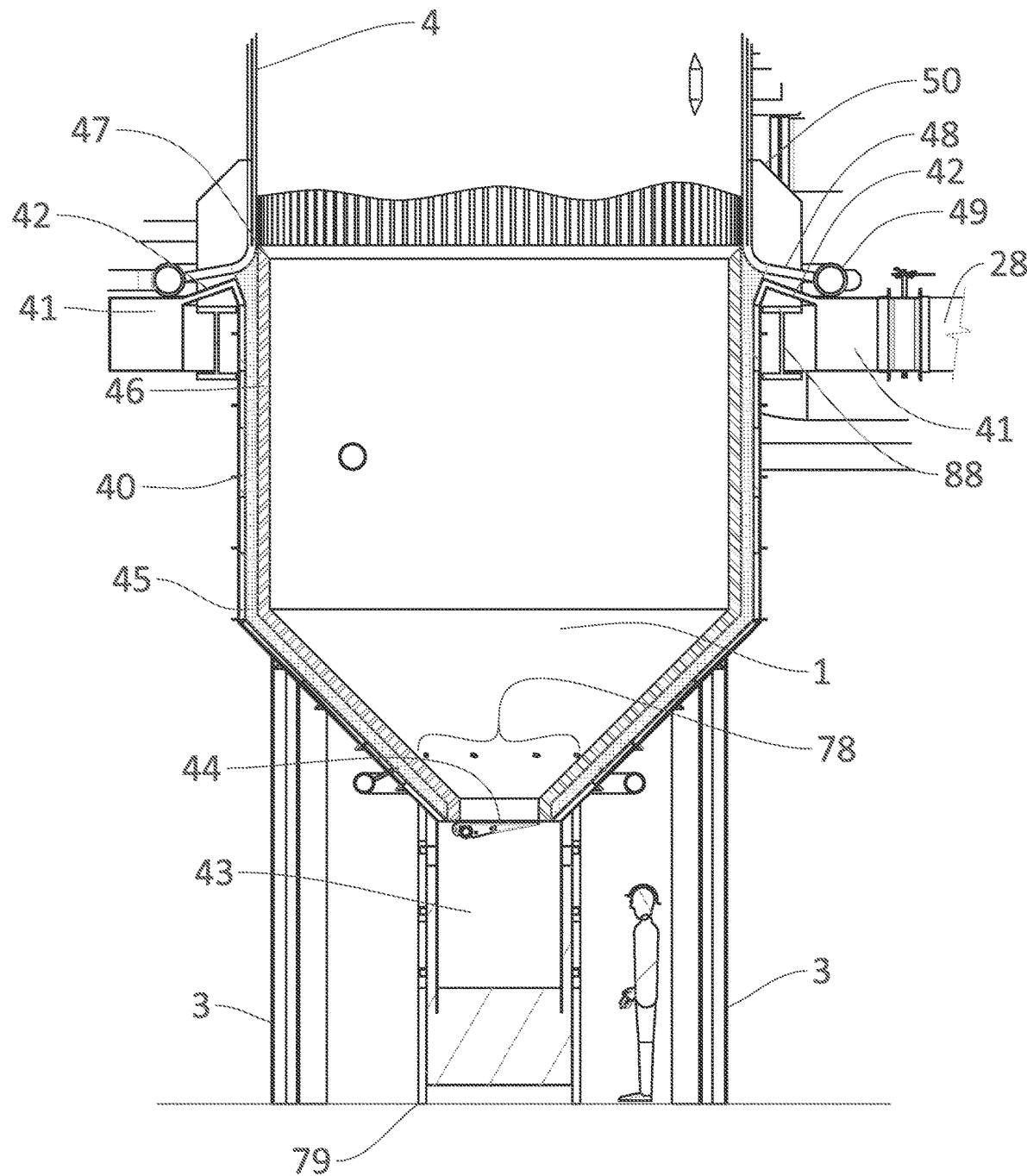
FIG. 6 is a detail section view of combustion chamber 1 of the boiler of FIGS. 1-2 at a third section C in accordance with one or more embodiments of the present invention.

Referring now to FIG. 6, a detail section view of combustion chamber 1 of the boiler of FIGS. 1-2 is shown at a third section C in accordance with one or more embodiments of the present invention. Combustion chamber 1 has an inverted truncated conical bottom section and a cylindrical upper section. The upper and lower sections have inner and outer steel walls. According to an illustrative embodiment, the inner and outer steel walls are spaced about 2" apart forming combustion air plenum 40.

Circular air duct 41 encircles the top of combustion air plenum 40 and feeds combustion air to combustion air plenum 40 by annular duct 42. Combustion air is fed from combustion chamber duct 28, shown in FIG. 2, to circular air duct 41. Combustion air flows down through combustion air plenum 40 and into ash chute 43 where it turns and flows upward through pivotable ash grate 44.

Immediately to the inside of combustion air plenum 40 is a layer of thermal insulation 45, concentric and in contact with the inner wall of combustion air plenum duct 40. The insulating layer 45 extends from the top of ash grate 44 to the top of combustion chamber 1. Insulating layer 45 may be comprised of, for example but not limited to, insulating type refractory, ceramic paper, ceramic bats, poured refractory, precast refractory tiles, or some combination of these or other suitable materials. Insulating layer 45 may be of, for example but not limited to, from 4 inches to 6 inches thick.

Immediately to the inside of insulating layer 45 is a layer of working refractory layer 46, concentric and in contact with the inner surface of insulating layer 45. Working refractory layer 46 extends from the top of ash grate 44 to the top of combustion chamber 1. Working refractory layer 46 may be, for example, up to 6 inches thick. The top edge working refractory layer 46 may form a protective curb 47 reposed against the boiler tube walls. According to an illustrative embodiment, working refractory layer 46 is comprised of a high strength abrasion resistant refractory material with an operating temperature limit of up to 3000 degrees Fahrenheit. The refractory of working refractory layer 46 also has relatively high density and thermal conductivity.

Combustion air plenum 40 acts as a thermal barrier between combustion chamber 1 and foundation 3 and also as an air heater for the combustion air flowing to the boiler. According to an illustrative embodiment, the described construction around the inside perimeter of combustion chamber 1 retains as much of the heat of combustion as possible in the combustion chamber, without transmitting that heat to adjacent boiler walls, as in conventional boilers, or to the adjacent supporting structures. This heat retention increases the temperature in the combustion chamber and allows the firing of wetter fuel.

Insulating layer 45 is required to minimize the heat transfer out of combustion chamber 1 and working layer 46 is required to provide protection to insulating layer 45. While insulating layer 45 has low thermal conductivity some heat will still be transmitted through it therefore combustion air plenum 40 is required to prevent overheating foundation 3.

According to an illustrative embodiment, the described construction around the inside perimeter of combustion chamber 1 is to act as a heat sink around the combustion chamber. Working layer 46 has a relatively high heat capacity and therefore will retain a lot of heat. If the temperature drops in combustion chamber 1, due for example to a batch of overly wet fuel, the heat contained in working layer 46 will be radiated to combustion chamber 1 where it will help to dry and ignite the wet fuel and stabilize the combustion process.

The quantity, diameter, and thickness of the wall tubes of cylindrical furnace 2 depends at least in part on the structural loads imposed by the weight of the boiler supported above. According to an illustrative embodiment, the number of tubes can be minimized to reduce the cost. According to an illustrative embodiment, the tubes are therefore typically spaced apart around their common radius such that a gap of 1" or more exists between the crowns of adjacent tubes.

Steel membrane bars, for example, being ¼" thick, are welded between the tubes to form a completely air tight and rigid structure. According to an illustrative embodiment, the membrane bars are coplanar with the axes of the two tubes that they bridge between. At the upper and lower ends of the cylindrical furnace the membrane bars may be thicker where they transfer loads to and from the adjoining structures.

Convective section 6 is constructed of perimeter tube walls. The tubes therein may be, for example but not limited to, 2" to 3" in outside diameter and spaced apart 1" or more crown to crown with steel membrane there between. The size of the tubes and membrane bars is determined in part by the structural loads carried by those members.

Referring to FIG. 6, a detail section view of combustion chamber 1 of the boiler of FIGS. 1-2 is shown at a third section C in accordance with one or more embodiments of the present invention. At the bottom of cylindrical furnace 2, the wall tubes are bent relative to the vertical axis of the tubes to form horizontal section 48 such that the tubes extend radially to intersect toroidal header 49. Toroidal header 49 has a larger major radius than cylindrical tube wall 4 so that toroidal header 49 is not subjected to the heat of the furnace or the stress of supporting any structural loads. The same arrangement is used at the top of cylindrical furnace 2.

Referring again to FIG. 2, tube walls 51 of convective section 6 are flat panels and the upper and lower extremities of the tubes are bent out of the plane of the walls to form horizontal tube sections 52. Horizontal tube sections 52 intersect upper and lower headers 53. Upper and lower headers 53 are discrete straight pipes, parallel to corresponding tube walls 51 and spaced laterally away from tube walls 51 so that headers 53 are not subjected to the heat of the boiler or the stress of supporting any structural loads.

Economizer section 7 is a tightly spaced tube bundle supported by suitably reinforced carbon steel walls. Wall tubes are not required in economizer section 7 because the internal gas temperature is low enough that the walls do not require cooling. The top of convective section 6 is fitted with support flange 54 and the bottom of economizer section 7 is fitted with matching flange 55.

Referring again to FIG. 6, a plurality of vertical web plates 50 are welded to the previously described membrane bars that are welded between the tubes. The plurality of vertical web plates 50 transmit structural loads from convective section 6 to transition section 10, from transition section 10 to cylindrical furnace 2, and from cylindrical furnace 2 to foundation structure 3. The size and quantity of web plates 50 depends on the loads to be transferred. According to an illustrative embodiment, the arrangement of vertical web plates 50 distributes the loads over a large area of the walls to minimize the stresses on the pressurized wall tubes and to eliminate any external loads on horizontal tube sections 48 and 52 and headers 49 and 53.

At the bottom of cylindrical furnace 2, web plates 50 may be manufactured integrally with annular duct 42 and circular beam 88 to allow combustion air to flow between web plates 50.

Figure 7:
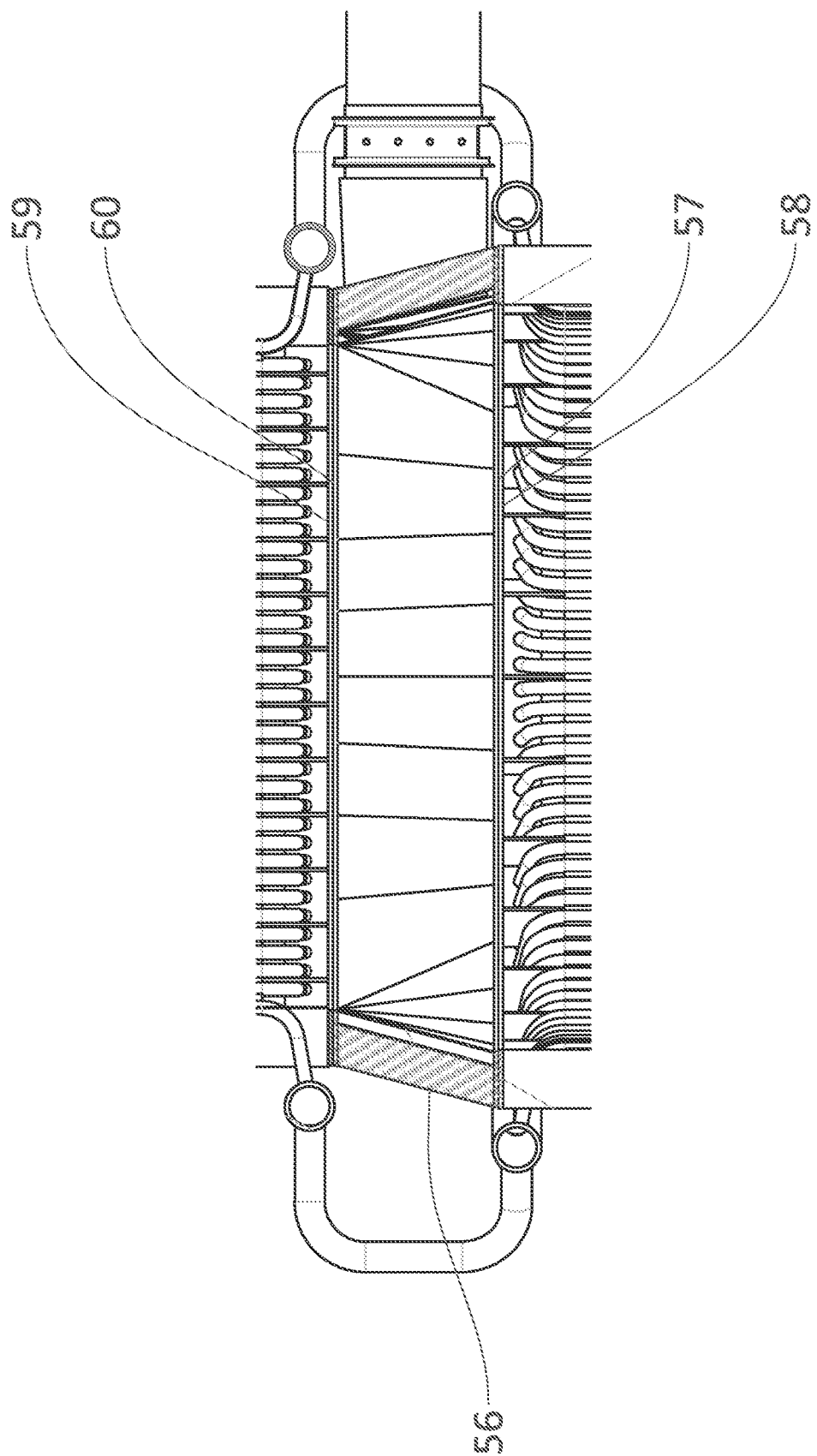
FIG. 7 is an external detail view of transition section 10 of the boiler of FIG. 2 at a fourth section F in accordance with one or more embodiments of the present invention.

Referring to FIG. 7, an external detail view of transition section 10 of the boiler of FIG. 2 is shown at a fourth section F in accordance with one or more embodiments of the present invention. Web plates 50 support circular flange 58 at the top of cylindrical furnace 2 and rectangular flange 59 at the bottom of convective section 6.

Figure 8:
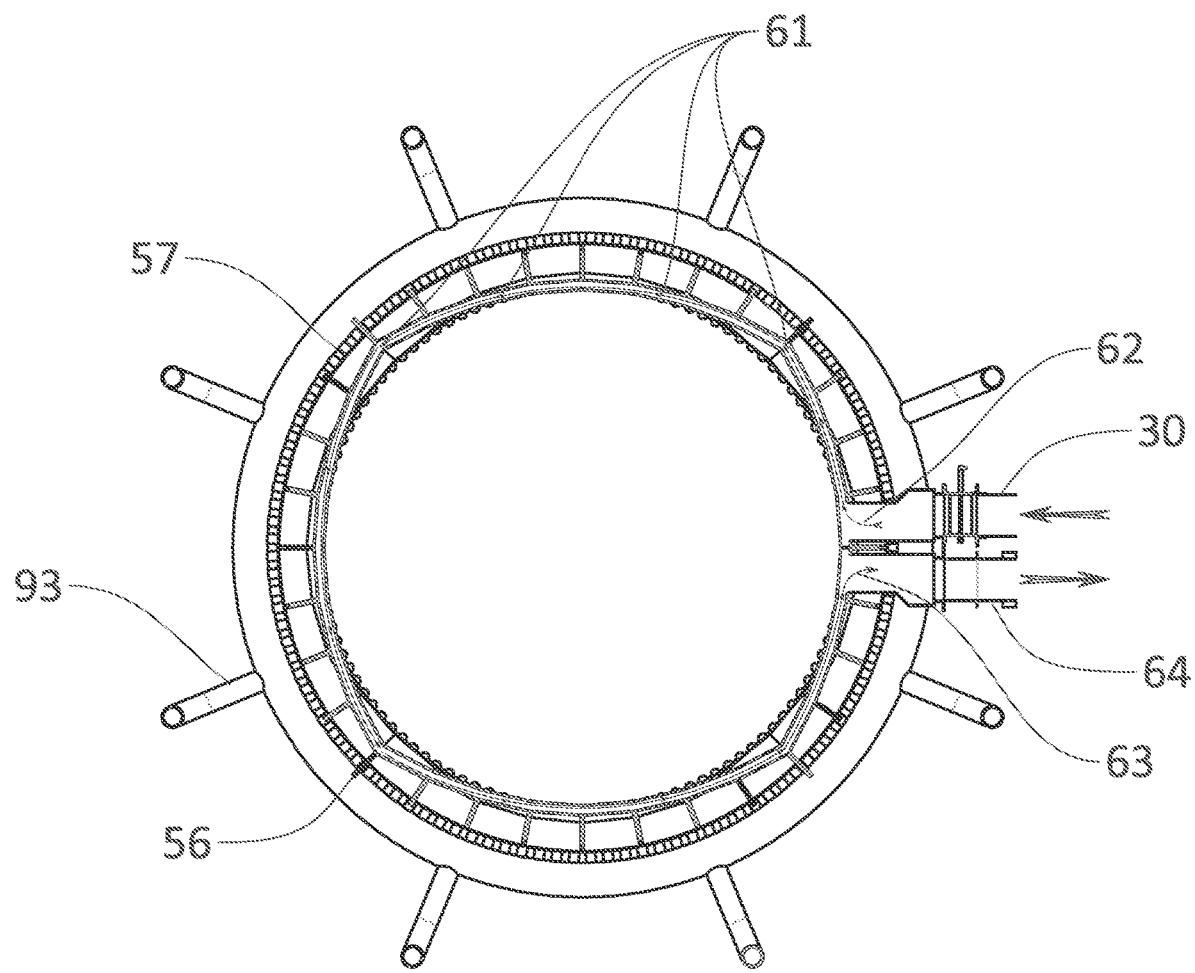
FIG. 8 is a plan view of transition section 10 of the boiler of FIG. 2 taken at a fifth section D-D in accordance with one or more embodiments of the present invention.

Referring to FIGS. 7 and 8, wherein FIG. 8 is a plan view of transition section 10 of the boiler of FIG. 2 taken at a fourth section D-D in accordance with one or more embodiments of the present invention, transition section 10 is constructed with plural external web plates 56. External web plates 56 are constructed into an array that matches the corresponding web plates at the bottom of convective section 6, at the top of cylindrical furnace 2, support circular flange 57 at the bottom, and rectangular flange 60 at the top. Circular flange 57 matches circular flange 58 at the top of cylindrical furnace 2 and rectangular flange 60 matches rectangular flange 59 at the bottom of convective section 6.

Section 10 transitions from round at the bottom to rectangular at the top with a double wall construction forming plenum 61 around the inside perimeter. Combustion air flows in at 62 from transition section duct 30, flows around plenum 61 cooling the structure and absorbing heat, then flows out at 63 and into jumper duct 64.

Referring again to FIGS. 3-5, the partially heated combustion air flows through jumper duct 64 to ring duct 65 and then to gas extraction ducts 66 described below. The combustion air flows through and cools the supporting structure of gas extraction ducts 66, absorbs additional heat, then flows through loop ducts 67 to air heaters 31. Alternatively loop ducts 67 could bypass air heaters 31 and discharge directly to hot air ducts 32.

As can be seen in FIGS. 1-5, a gas extraction system is shown according to an illustrative embodiment. The gas extraction systems consist of gas extraction ducts 66, air heaters 31, gas ducts 68, gas cyclones 69, and suction ducts 70.

Referring to FIG. 9, an exterior plan view one of cylindrical furnace 2 of the boiler of FIGS. 1-2 is shown in accordance with one or more embodiments of the present invention. One or more extraction ducts 66 intersect cylindrical furnace 2 tangentially. Extraction ducts 66 are constructed to withstand the high combustion gas temperature. Extraction ducts 66 includes inner working refractory layer 71, middle layer 72, and an outer supporting structure 73 incorporating a cooling air plenum.

The operation of the gas extraction system is described below. Referring again to FIGS. 1-4, fuel injection systems 18 and 21 are comprised of injection fans 74, injection tees 75, air lock feeders 76, conveyors 77, and injection pipes 24 and 25. Fuel is fed from fuel chutes 20 and 23 through conveyors 77 and air lock feeders 76 to injection tees 75 where combustion gas from injection fans 74 blows it into the boiler.

Referring again to FIG. 6, a plurality of fluidizing nozzles 78 are arrayed around the bottom of combustion chamber 1. Fluidizing nozzles 78 inject pressurized steam, air, or recirculated flue gas, or a combination thereof, into the fuel filling the bottom of combustion chamber 1. The injected gas will fluidize the fuel bed to improve drying and combustion of the fuel and help separate contaminants. If the temperatures are high enough, injecting steam will cause a water-gas shift reaction in which pyrolyzed carbon reacts with water vapor (steam) to produce carbon dioxide and hydrogen, the hydrogen then burning cleanly in combustion chamber 1 and/or cylindrical furnace 2.

At the bottom of combustion chamber 1 is ash grate 44 and ash chute 43. Ash and contaminants will work their way to the bottom of combustion chamber 1 due to agitation from fluidizing nozzles 78. Ash grate 43 opens periodically and dumps the ash into ash chute 43 where it is removed by ash conveyor 79. Water fills ash conveyor 79 to a level above the bottom of ash chute 43 to prevent hot gas from escaping the boiler. Molten slag may form if the boiler is burning coal in which case the slag can flow to the water filled conveyor where it is quenched and removed. Ash from gas cyclones 69 falls to portable dumpsters (not shown) that are emptied as needed.

Typically steam drums are the most expensive component of an industrial boiler due to their size, complexity, and wall thickness. Steam drums for power boilers are typically five feet or more in diameter with a wall thickness up to 4 inches or more and, according to the prior art, are oriented with their axis horizontal. This provides convenient penetrations for the feeding and relieving pipes, provides a large water surface area, and provides room for multiple steam separators above the water.

An illustrative embodiment uses a vertical steam drum. Vertical drum 80 has several advantages over a horizontal drum.

Referring again to FIGS. 2-5, vertical drum 80 is located with its mid-point about level with the vertical mid-point of economizer section 7, offset laterally from the boiler, and supported by single downcomer 87. Vertical drum 80 is well adapted because this is a tower type boiler and the convective sections are also oriented vertically allowing the feeding and relieving pipes to be economically and functionally arranged.

Tube wall relieving pipe(s) 81, generator relieving pipe(s) 82, screen relieving pipe(s) 83, and economizer feed pipe(s) 84 all enter the boiler tangentially to impart a rotation of the water in the drum. Likewise steam pipe 85 exits vertical drum 80 tangentially to promote rotation of the steam inside the drum in the same direction as the water. Rotating the steam and water in the drum has multiple benefits including centrifuging water drops entrained in the steam to the walls where it comes out of suspension. Rotating the water increases the water surface area due to the parabolic surface created by centrifugal force. Rotating the steam centrifuges colder and less saturated water to the walls which forces hotter and more saturated water to the center where the saturated steam is more readily separated due to the parabolic dished surface. Rotating the water improves the water circulation in the boiler by better separation of the cold feedwater from the hotter saturated water. Rotating the steam feeds steam into a vortex type steam separator more efficiently. Rotating the water improves the flow entering the drum from the relieving pipes due to less back pressure resistance.

The vertical drum arrangement also provides for very quick feedwater control response as the water level fluctuations will be more pronounced and will be sensed very quickly. The vertical drum arrangement allows the use of a cartridge type steam separator in the top of the drum that is less expensive and can be easily removed for maintenance. The vertical drum arrangement, according to an illustrative embodiment, can be supported by just one downcomer. The vertical drum arrangement more easily removes undissolved solids within the water because they deposit at the bottom of the downcomer and not within the drum. The vertical drum arrangement allows a significant reduction in the diameter and wall thickness of the drum which in turn further reduces the cost.

The rotation of the water can inhibit flow into the downcomer. Therefore, according to an illustrative embodiment, counteracting baffles can be added.

The rotation of the water will tend to keep contaminants in suspension. Therefore, according to an illustrative embodiment, the blow down drain 86 can be moved to the bottom of downcomer 87.

The illustrative embodiments enable modular construction and modular erection. To the extent that the field erection time is minimized, and field work can be shifted to shop work, the total cost of the boiler will be reduced.

Referring again to FIG. 2, combustion chamber 1, cylindrical furnace 2, transition section 10, convective section 6, and economizer section 7 can be shipped from the manufacturing facility to the erection site as complete modules, to the fullest extent possible depending on shipping capacities, crane capacities. Furthermore, combustion chamber 1, transition section 10, and converging top cap 8 can be constructed from plate steel. Combustion chamber 1, transition section 10, and converging top cap 8, being non pressure parts, can be fabricated at shop facilities close to the erection site reducing shipping costs and utilizing less skilled and less expensive local labor. The same is true for many other components such as air ducts, gas ducts, fuel chutes, and fuel bins.

Cylindrical furnace 2, convective section 6, and economizer section 7 are pressure parts and must be constructed to the applicable codes and standards. Therefore they will be fabricated at accredited facilities, possibly at a great distance from the erection site or even overseas. Depending on the size of the boiler, these components can be constructed complete with their headers at the fabrication shop and pressure tested before shipment.

Referring to FIG. 2, once foundation structure 3 is in place, the boiler is erected by first placing combustion chamber 1 on foundation structure 3, then placing in order cylindrical furnace 2, transition section 10, convective section 6, and economizer section 7. Downcomer 87 and vertical steam drum 80 would follow suit as well as other large components such as distribution duct 27 and air heaters 31.

By erecting the boiler with complete modules time consuming and expensive field welds of the pressure parts are minimized. For example, to connect cylindrical furnace 2 to convective section 6 only twelve field welds are required to connect the six jumper pipes 93. Similarly, very few field welds are required to connect feed pipes 94 and the previously mentioned pipes 81-85. A building (not shown) can support the lateral wind, seismic loads and the weights of the auxiliary components. However, because the building does not support the weight of the boiler, the boiler can be more lightly and rapidly constructed reducing the overall cost of the project.

On many ground supported boilers it is difficult to support the boiler while at the same time accommodating thermal expansion. In some embodiments of the present invention, combustion chamber 1 and transition section 10 are heated by the combustion inside the boiler and cooled by combustion air flowing through their respective plenums. Transition section 10 is lined with layers of insulating refractory and working refractory similar to combustion chamber 1 described above. This limits the heat transfer to combustion chamber 1 and transition section 10. Both combustion chamber 1 and transition section 10 operate at temperatures close to the temperature of water cooled cylindrical furnace 2 and convective section 6, therefore the differential thermal expansion will be minimized.

The gas temperature entering economizer section 7 is relatively low. Therefore, the differential thermal expansion between economizer section 7 and convective section 6 can be easily managed with metallic expansion joints.

According to an illustrative embodiment, the boiler has an improved ability to burn very wet, very light solid fuels, and fuels with high ash content or particulate contamination. Any solid fuel must dry before it can burn. Very light fuels such as sugar cane pith, bagasse, leaves, and tops, the fuel tends to become entrained in the gas flow before it is dry. Therefore, in conventional boilers, there is not enough time to complete the combustion of the fuel before it exits the top of the boiler.

Additionally, many biomass fuels contain a lot of particulate contamination, typically sand, which erodes the boiler tube surfaces if not removed from the fuel or the combustion gas. According to an illustrative embodiment, to counteract this erosion, the combustion gases are rotated to increase the flight path of the fuel particles giving them time to dry and separating them from the main gas stream going to the convective section of the boiler. Rotating the suspended particles also attenuates the particle size with collisions and wall scraping, which results in exposing more fuel surface. Rotating the combustion gases also aids in removing the contaminating particulates as described below.

Circulating fluidized bed (CFB) boilers divert all of the combustion gas through one or more cyclone separators downstream from the main combustion chamber to remove particulates (sand, ash, and unburned fuel) from the gas stream before returning the particulates back to the boiler to be recirculated. CFB boilers are considered the best current technology for burning difficult fuels but they are expensive and have a lot of erosion problems from the circulating particulates. The present invention is an improvement upon CFB boilers.

Referring to FIGS. 1, 2, and 5, fuel is transported by fuel injection systems 18 and 21 via injection pipes 24 and 25 and injected tangentially into combustion chamber 1 as indicated by arrows 89. The fuel is injected at least by one fuel port and at least at one elevation as shown by fuel port 90.

Combustion air is also injected tangentially as indicated by arrows 90 via multiple over fired air nozzles 34. At least two air nozzles 34 are used at a minimum of one elevation but preferably multiple elevations are used, each with at least two air nozzles 34. It is preferred to use only two air nozzles 34 at a given elevation, oriented 180 degrees apart, with their centerlines parallel and equally offset from the centerline of cylindrical furnace 2, with the air jets emitted therefrom flowing in opposite directions.

The tangential injection of the fuel and combustion air imparts a rotation to the combustion gases rising in furnace 2. In addition, fluidizing nozzles 78 are angled to inject the media flowing therefrom at an upward angle similar to the angle of the conical bottom of combustion chamber 1, and at a radial angle shown by arrows 92 in order to further promote rotation of the fuel and gas in the boiler.

Referring again to FIG. 9, gas extraction ducts 66 pull a portion of the rising combustion gases out of cylindrical furnace 2 at the top of cylindrical furnace 2. At the height of gas extraction ducts 66 combustion of the fuel and volatile gases is substantially complete. Therefore the extracted gas is relatively inert but very hot. The rapidly rotating column of combustion gas centrifuges entrained ash and contaminating particles 95 to the wall of cylindrical furnace 2 where it is knocked out of suspension by contact with the wall or extracted with the gas as shown by arrows 96.

Therefore cylindrical furnace 2 acts as a cyclone separator to remove ash and contaminating particles from the gas flow before the gas enters convective section 6. The rotating column of gas also centrifuges unburned fuel particles and colder/denser combustion air to the perimeter of cylindrical furnace 2 where higher concentrations of oxygen and fuel improve the fuel burnout speeds. As the colder/denser combustion air moves to the perimeter of cylindrical furnace 2, hotter combustion gases will be displaced to the center.

According to an illustrative embodiment, the lateral spacing of some of air nozzles 34 can be varied to be closer to the centerline of furnace 2 to ensure complete combustion of the pyrolyzed gases.

Gas extraction ducts 66 intersect cylindrical furnace 2 tangentially but in mirror image relation to air nozzles 34. Therefore the suction created through the gas extraction system by injection fans 74 further reinforces the rotation of gases in cylindrical furnace 2. According to an illustrative embodiment, the hot gas extracted from furnace 2 at extraction ducts 66 comprises from about 10%-50%, preferably about 30%, of the flow of combustion gas. Because the particulates are concentrated around the perimeter of cylindrical furnace 2, the efficiency of particulate extraction is much higher than the percentage of gas extracted.

After extraction the gases flow down through the air heater tubes 91, through gas ducts 68, gas cyclones 69, suction ducts 70, injection fans 74, injection tees 75 where it picks up the fuel, and then through injection pipes 24 and 25 where the fuel is pneumatically conveyed to the boiler. Ash and contaminants are separated from the gas flow at gas cyclones 69 so that they are not recirculated to the boiler. If the fuel is heavily contaminated or has a high content of abrasive ash, it may be advantageous to line the inside perimeter of cylindrical furnace 2 with a suitable refractory to protect tube wall 4 from excessive erosion. The cyclonic fuel injection created in combustion chamber 1 also performs the first stage separation of fuel contaminants such as sand from the fuel.

The hot recirculated gas will heat and at least partially dry the fuel as it is being injected into the boiler. If the fuel has already passed through a fuel dryer, the injecting gas is hot enough to further heat and/or dry or at least partially dry any remaining wet fuel. If the fuel hasn't passed through a dryer, the hot gas will start the heating and drying that otherwise would occur in the boiler and would give the combustion a head start. The length of injection pipes 24 and 25 can be lengthened if needed, especially if a drying system is not used, to increase the pre-heating and pre-drying of the fuel.

Most biomass boilers utilize a balanced draft system in which combustion air is injected into the boiler by a forced draft fan and combustion gases are removed by an induced draft fan. In these boiler the interior of the furnace is operated at a pressure slightly below atmospheric pressure. This is advantageous in that there is a suction at any opening or leakage points preventing hot gases from escaping the boiler. However, the disadvantages are the added capital and operating costs, the added control complexity, and added maintenance costs. In order to minimize the cost of the boiler, simplify the operation, and improve combustion in the boiler, some embodiments of the present invention use only forced draft fan 26 and no induced draft fan. The boiler will run a positive pressure of about 1 PSI therefore the boiler must be carefully sealed. Besides lower cost and simplified operation, the performance of the boiler is improved because the elevated pressure concentrates the oxygen in the boiler slightly. This is similar to pressurized circulating fluidized bed (PCFB) boilers but at lower internal pressure.

A first alternative to embodiment described above places gas cyclones 69 upstream from air heaters 31 such that gas extraction ducts 66 discharge directly to gas cyclones 69. This first alternative embodiment is advantageous when the gas stream is heavily laden with abrasive particulate matter.

A second alternative embodiment is to replace air heaters 31 with steam or water filled tubes as part of the steam or water heating circuits. This is advantageous if, for example, cylindrical furnace 2 is lined with refractory which inhibits heat transfer therefore more heating surface is needed.

In a third alternative embodiment, if a significant portion of unburned fuel is collected at gas cyclones 69, that fuel can be separated from the ash and contaminants and re-injected into the boiler.

In a fourth alternative embodiment fluidized dryer 14 can be replaced with a rotary dryer, pre-drying fuel chutes as described in U.S. Pat. No. 8,590,463, some other type of fuel dryer or fuel heater, or a fuel bin and/or a tubular air heater.

A fifth alternative embodiment is to run the boiler with a balanced draft using an induced draft fan to evacuate the combustion gases.

A sixth alternate embodiment is to operate the boiler as a gasifier in which at least some or all of the pyrolyzed combustible gas is removed from the boiler for combustion elsewhere or other purposes.

We claim:

1. A cylindrical furnace having a vertical axis around which a combusting fuel and gases are rotated to centrifugally move entrained particulates and denser gases to a perimeter of said cylindrical furnace and incorporating at least one extraction duct for removing at least a portion of said particulates, said extraction duct intersecting said cylindrical furnace at a location in an upper half of said cylindrical furnace, with less than 100% of the total gas moving through said cylindrical furnace exiting out the top of said cylindrical furnace and the balance of said gas flow exiting through at least one of said extraction ducts, in which an air cooled and refractory lined combustion chamber is located contiguously below said cylindrical furnace, said combustion chamber being circular in plan form, in which solid fuel particles are injected into said combustion chamber and at least partially burned therein.

2. The cylindrical furnace of claim 1, in which solid fuel particles are entrained in said rotating gases and the average residence time of said solid fuel particles inside said cylindrical furnace is greater than the average residence time of said total gas moving through said cylindrical furnace.

3. The cylindrical furnace of claim 1 in which said solid fuel particles at least partially fill said combustion chamber forming a fuel bed and in which said fuel bed is fluidized in a manner that causes it to rotate around a vertical axis in said combustion chamber.

4. The cylindrical furnace of claim 1 in which said extracted gas flows through a tubular air heater, a water or steam filled heat exchanging tube bundle, a cyclone particulate separator, a fan, a fuel injection tee, or any combination or order thereof, said gas being returned to said combustion chamber.

5. The cylindrical furnace of claim 1 in which said extracted gas flow is used to inject fuel into said combustion chamber.

6. The cylindrical furnace of claim 1 in which at least some of the required combustion air is injected into said cylindrical furnace in a manner to induce rotation of the gases therein around a vertical axis.

7. The cylindrical furnace of claim 6 in which said combustion air is injected at least at one elevation with two nozzles at each of said elevations, with a flow from each of said two nozzles 180 degrees apart and equally offset from the centerline of said cylindrical furnace.

8. The cylindrical furnace of claim 7 in which a lateral offset of said nozzles at any given elevation may differ from said lateral offset at any other given elevation.

9. The cylindrical furnace of claim 6 in which said combustion air is at least partially replaced with recirculated flue gas.

10. The cylindrical furnace of claim 1 in which an internal gas pressure inside said cylindrical furnace is higher than an external ambient atmospheric pressure.

11. A method to produce steam through the combustion of fuels, comprising:
tangentially injecting fuel and combustion air into a cylindrical furnace in accordance with claim 1 of a ground supported power boiler;
pressuring the interior of the boiler to above atmospheric pressure;
stripping particulates from flue gases;
recirculating the flue gases; and
capturing heat from the flue gases.

12. The method of claim 11 in which stripping particulates from the flue gases includes rotating fuel and gases to centrifugally move entrained particulates and denser gases to a perimeter of a combustion chamber.

13. The method of claim 12 further comprising removing at least a portion of said particulates through at least one extraction duct.

14. The method of claim 11 further comprising fluidizing the fuel in a fuel bed.

15. The method of claim 11 further comprising heating the fuel prior to feeding the fuel into the ground supported power boiler.

16. A cylindrical furnace having a vertical axis around which a combusting fuel and gases are rotated to centrifugally move entrained particulates and denser gases to a perimeter of said cylindrical furnace and incorporating at least one extraction duct for removing at least a portion of said particulates, said extraction duct being refractory lined and air cooled, said extraction duct intersecting said cylindrical furnace at a location in an upper half of said combustion chamber, with less than 100% of the total gas moving through said cylindrical furnace exiting out the top of said cylindrical furnace and the balance of said gas flow exiting through at least one of said extraction ducts.

17. The cylindrical furnace of claim 16 in which said exiting gas flows through one or more of a fuel dryer, a cyclone separator, a bag house filter, and an electrostatic precipitator, and then to a boiler.

18. The cylindrical furnace of claim 17 in which said exiting gas flow created by an elevated internal gas pressure in said cylindrical furnace, and; in which said elevated internal gas pressure inside said cylindrical furnace is created by one forced draft fan or by one forced draft fan and at least one fuel injection fan.

19. A cylindrical furnace section having a vertical axis around which a combusting fuel and gases are rotated to centrifugally move entrained particulates and denser gases to a perimeter of said cylindrical furnace and incorporating at least one extraction duct for removing at least a portion of said particulates, said extraction duct intersecting said cylindrical furnace at a location in an upper half of said combustion chamber, with less than 100% of the total gas moving through said cylindrical furnace exiting out the top of said cylindrical furnace and the balance of said gas flow exiting through at least one of said extraction ducts, in which at least some of said extracted gas or at least some of said gas exiting out the top of said cylindrical furnace is used to heat and/or at least partially dry at least some of the incoming fuel.

20. The cylindrical furnace of claim 19 in which said exiting gas makes direct contact with the incoming fuel to at least partially dry the fuel.

21. The cylindrical furnace of claim 20 in which fuel particles entrained in gas exiting said fuel dryer passes through at least one cyclone separator after which captured fuel is sent to said cylindrical furnace.

22. The cylindrical furnace of claim 20 in which heavy fuel solids not entrained in said gas exiting said fuel dryer pass out a bottom of said fuel dryer and are sent to said cylindrical furnace.

23. The cylindrical furnace of claim 19 in which said fuel dryer is a fluidized bed fuel dryer and said exiting gas fluidizes a fuel bed therein.

* * * * *